United States Patent [19]

Evens

[11] 4,420,595
[45] Dec. 13, 1983

[54] PROCESS FOR THE PREPARATION OF COPOLYMERS OF ETHYLENE WITH AT LEAST ONE OTHER 1-ALKENE

[75] Inventor: Georges G. Evens, Maasmechelen, Belgium

[73] Assignee: Stamicarbon B.V., Geleen, Netherlands

[21] Appl. No.: 282,012

[22] Filed: Jul. 10, 1981

[30] Foreign Application Priority Data

Jul. 11, 1980 [NL] Netherlands .......................... 8003997
Jun. 5, 1981 [NL] Netherlands .......................... 8102723

[51] Int. Cl.$^3$ ........................ C08F 4/68; C08F 210/18
[52] U.S. Cl. .................................... 526/141; 526/140; 526/143; 526/144; 526/282
[58] Field of Search ................ 526/140, 141, 143, 144

[56] References Cited

U.S. PATENT DOCUMENTS

| | | | |
|---|---|---|---|
| 3,441,546 | 4/1969 | Garner et al. ........................ | 526/141 |
| 3,629,212 | 12/1971 | Benedikter et al. ................ | 526/143 |
| 3,717,613 | 2/1973 | Ichikawa et al. .................... | 526/141 |
| 3,723,348 | 3/1973 | Apotheker et al. ................. | 526/143 |
| 3,876,595 | 4/1975 | Ogura et al. ......................... | 526/143 |

FOREIGN PATENT DOCUMENTS 47-42141 10/1972 Japan .................................. 526/141

Primary Examiner—Edward J. Smith

[57] ABSTRACT

Process for the preparation of copolymers consisting of 25–85% by wt. of ethylene, 15–75% by wt. of at least one other 1-alkene and optionally up to 20% by wt. of a polyunsaturated compound with application of a catalyst system containing a compound of a metal from sub-groups IV–VI of the periodic system and a compound of a metal from groups I–III of the periodic system, in which at least one hydrocarbon group is bound directly to the metal atom via a carbon atom, the polymerization being carried out in the presence of certain halogen containing activators.

9 Claims, No Drawings

PROCESS FOR THE PREPARATION OF COPOLYMERS OF ETHYLENE WITH AT LEAST ONE OTHER 1-ALKENE

The invention relates to a process for the preparation of copolymers consisting of 25–85% by wt. of ethylene, 15–75% by wt. of at least one other 1-alkene and optionally up to 20% by wt. of a polyunsaturated compound, with application of a catalyst system containing a compound of a metal from the sub-groups IV to VI of the periodic system and a compound of a metal from groups I to III of the periodic system, in which at least one hydrocarbon group is bound directly to the metal atom via a carbon atom.

Such processes have been known for quite some time and already find large-scale industrial application. It has been found that the most suitable catalyst systems contain vanadium compounds soluble in the polymerization medium, and alkyl aluminium halides. A disadvantage of these catalyst systems, however, is their relatively low activity, which implies that the catalyst costs per weight unit of polymer are rather high, while furthermore intensive purification of the polymer obtained is required to remove the catalyst residues.

For those reasons, attempts have been made for quite some time already to find possibilities to increase the polymerization yield, and it has been found that this can be achieved by addition of certain substances to the catalyst system. In Dutch patent application No. 6410447, for instance, it is proposed to use various halogenated compounds as promotor or activator, such as trichloroacetic acid or esters thereof, hexachloroacetone, hexachloropropylene or alpha-trichlorotoluene. It has been found very effective to use perchlorocrotonic acid compounds as activator, as described in Dutch patent application No. 6712044. However, these compounds have the disadvantage of possessing a high chlorine content. The conversion products of the perchlorocrotonic acid compounds partly remain behind in the polymer and cannot be removed from it to a sufficient degree through the usual steps for removal of catalyst residues, so that the polymers obtained with application of these compounds have a high chlorine content. The properties of the products, particularly the resistance to aging under the influence of climatic conditions, are adversely affected by a high chlorine content. In addition, a high chlorine content in the polymer appears to give rise to corrosion phenomena in the processing equipment. Consequently, there remained a need for a process for the preparation of copolymers of ethylene with at least one other 1-alkene and optionally a polyunsaturated compound by which a high polymer yield per weight unit of catalyst as well as a low halogen content of the product could be obtained.

A process has been found now for the preparation of cpolymers consisting of 25–85% by wt. of ethylene, 15–75% by wt. of at least one other 1-alkene and optionally up to 20% by wt. of a polyunsaturated compound, with application of new activators for the catalyst system, by which high polymer yields per weight unit of catalyst are obtained. In many cases this process yields polymers with a low halogen content.

The process according to the invention for the preparation of copolymers consisting of 25–85% by wt. of ethylene, 15–75% by wt. of at least one other 1-alkene and optionally up to 20% by wt. of a polyunsaturated compound with application of a catalyst system containing a compound of a metal from the sub-groups IV to VI of the periodic system and a compound of a metal from groups I to III of the periodic system, with at least one hydrocarbon group bound directly to the metal via a carbon atom, is characterized in that the polymerization is effected in the presence of a halogen-containing compound of one of the following groups:

a. Compounds of the general formula:

where A is a phenyl or benzoyl group with one or two substituent nitro groups,
X is a chlorine or bromine atom,
Y is a chlorine, bromine or hydrogen atom or a hydrocarbon group with 1–8 carbon atoms, and Z is a hydrogen atom or a group having one of the following formulas, in which both R and R' are a hydrocarbon group with 1–8 carbon atoms and X is a chlorine or bromine atom:

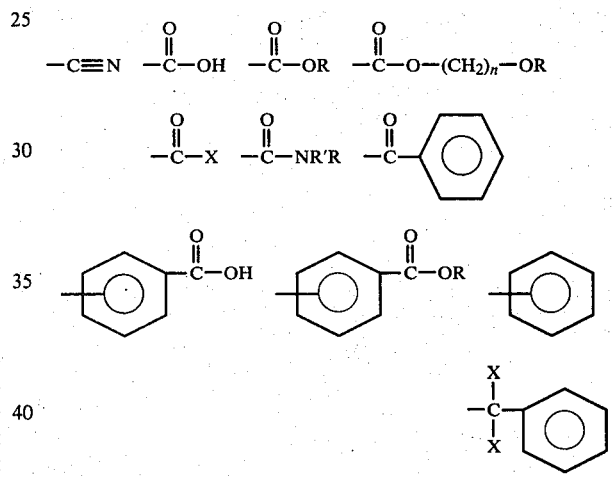

b. compounds of the general formula

where B is a phenyl group which may contain one or two substituent halogen atoms or alkyl groups, or is a thienyl, furyl, pyrollyl, N-alkyl pyrollyl or pyridyl group, which group is bound to the carbon atom directly or via a carbonyl group,
X is a chlorine or bromine atom,
Y is a chlorine, bromine or hydrogen atom or a hydrocarbon group with 1–8 carbon atoms, and
Q is a group having one of the formulas, in which X is a chlorine or bromine atom:

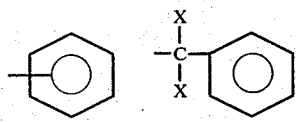

c. oxalyl chloride or oxalyl bromide.

Suitable compounds of group a. are for instance para-nitrobenzyl chloride, para-nitrobenzyl bromide, alkyl esters of monochloro (4-nitrobenzyl) acetic acid, such as the ethyl or butyl ester, alkyl esters of monobromo (4-nitrophenyl) acetic acid, alkyl esters of dichloro (4-nitrophenyl) acetic acid, alkyl esters of mono- or dichloro (2-nitrophenyl) acetic acid, phenyl (4-nitrophenyl) dichloromethane, phenyl (2-nitrophenyl) dichloromethane, phenyl (4-nitrophenyl) dibromomethane. Suitable compounds of group b. are, for instance, triphenyl chloromethane, triphenyl bromomethane, diphenyl dichloromethane, diphenyl dibromomethane, 1,2-diphenyl tetrachloroethane, 1,2-diphenyl dibromomethane, 2-thienyl phenyl dibromomethane.

Such compounds can be obtained for instance by the method described in Bull Soc. Chim. de France 1959 pp. 850 through 853 by M. Julia and M. Baillarge, or by analogous methods.

Preference is given to compounds containing one or two halogen atoms, such as nitrobenzyl chloride, diphenyl dichloromethane or oxalyl chloride.

The catalyst systems applied in the process according to the invention contain compounds of metals from groups I to III of the periodic system, with at least one hydrocarbon group bound directly to the metal atom via a carbon atom, and compounds of metals from the sub-groups IV to VI.

Suitable compounds of metals from groups I to III of the periodic system with at least one hydrocarbon group bound directly to the metal atom via a carbon atom are, for instance, the compounds of sodium, lithium, zinc and magnesium and in particular aluminium. The hydrocarbon group bound to the metal atom in these compounds will preferably contain 1 to 30 carbon atoms, more in particular 1–10 carbon atoms.

Examples of suitable compounds are amyl sodium, butyl lithium, diethyl zinc, butyl magnesium chloride and dibutyl magnesium. Preference is given to aluminium compounds, notably trialkyl aluminium compounds, such as triethyl aluminium, alkyl aluminium hydrides, such as diisobutyl aluminium hydride, alkyl alkoxy aluminium compounds, and halogen-containing aluminium compounds, such as diethyl aluminium chloride, diisobutyl aluminium chloride, monoethyl aluminium dichloride and ethyl aluminium sesquichloride. Mixtures of such compounds may also be used.

As compounds of metals from the sub-groups IV to VI of the periodic system, compounds of titanium and vanadium are suitable in particular, but compounds of other metals, such as chromium, molybdenum, tungsten and zirconium may also be used. Examples of suitable compounds are the halides, oxyhalides, the alkoxides and the acetyl acetonates, such as titanium tetrachloride, titanium tetrabromide, tetrabutoxy titanium, vanadium tetrachloride, vanadium oxytrichloride, vanadium acetyl acetonate, chromium trichloride, molybdenum pentachloride, tungsten hexachloride and zirconium tetrachloride. Preference is given to vanadium compounds which are soluble in the polymerization medium.

The molar ratio of the organometallic compound to the compound from groups IV–VI may be varied between wide limits. Generally, this ratio will lie between 1:1 and 1500:1. Preferably, it is chosen between 2:1 and 300:1, more in particular between 3:1 and 50:1.

The activating halogen-containing compounds are applied in such a quantity that the molar ratio relative to the metal from groups IV–VI is between 0.1:1 and 300:1, by preference it is chosen between 1:1 and 50:1, more in particular between 2:1 and 30:1. Besides the three components mentioned, other substances may be added to the catalyst if this is advantageous. Such additional substances could be Lewis bases, which may also be used as catalyst component. Addition of such compounds is by no means required though to achieve a high polymer yield per weight unit of catalyst.

Suitable 1-alkenes which may be applied as monomer beside ethylene and the 1-alkenes with at most 12 carbon atoms, for instance propylene, butene-1, pentene-1, hexene-1, octene-1, the branched isomers thereof, for instance 4-methyl pentene-1, styrene, alpha-methyl styrene or mixtures of the alkenes described in the foregoing. In particular propylene and/or butene-1 are/is suitable.

The polyunsaturated compounds which may be used and which serve to bring about non-saturation in the polymer are those which are known for this purpose; they contain at least two C=C bonds and may be either aliphatic or alicyclic. The aliphatic polyunsaturated compounds generally contain 3 to 20 carbon atoms, the double bonds being either conjugated or, preferably, non-conjugated. Examples are: 1–3-butadiene, isoprene, 2,3-dimethyl butadiene 1–3,2-ethyl butadiene 1–3, piperylene, myrcene, allene, 1,2-butadiene, 1,4,9-decatrienes, 1,4-hexadiene, 1,5-hexadiene and 4-methyl hexadiene 1–4. The alicyclic polyunsaturated compounds, in which a bridge group may be present or absent, may be either mono- or polycyclic. Generally applicable are for instance norbornadiene and its alkyl derivatives; the alkylidene norbornenes, in particular the 5-alkylidene norbornenes-2, in which the alkylidene group contains 1 to 20, preferably 1 to 8 carbon atoms; the alkenyl norbornenes, in particular the 5-alkenyl norbornenes-2, in which the akenyl group contains 2 to 20, preferably 2 to 10 carbon atoms, for instance vinyl norbornene, 5-(2'-methyl-2'butenyl)-norobornene-2 and 5-(3'-methyl-2'-butenyl)-noroboronene-2; diclopentadiene and the polyunsaturated compounds of bicyclo-(2,2,1)-heptane, bicyclo-(2,2,2)-octane, bicyclo-(3,2,1)-octane and bicyclo-(3,2,2)-nonane, at least one of the rings being unsaturated. Further, such compounds as 4,7,8,9-tetrahydroindene and isopropylidene tetrahydroindene may be used. In particular diclopentadiene, 5-methylene or 5-ethylidene norbornene-2, or hexadiene 1–4 are used. Mixtures of the compounds described in the foregoing may also be used.

The polyunsaturated compounds may be present in the polymer in quantities of up to 20% by wt., preferably up to 10% by wt., however.

Besides or instead of the polyunsaturated compound, an unsaturated compound with one or more functional groups, such as, for instance, halogen atoms, OH—, OR—, COOH—, COOR— or $NH_2$—groups, may be incorporated in the polymer, if desired, in a quantity of up to 20% by wt. Such functional monomers generally have an adverse effect on the activity of the polymerization catalyst. When applying the activators according to the invention, a reasonable polymerization rate can still be reached when functional monomers are present in the polymerization mixture.

The molar ratio of the monomers applied depends on the desired polymer composition. Since the polymerization rate of the monomers varies widely, generally valid ranges of molar ratios cannot be given. In the copolymerization of ethylene and propylene, however, generally a molar ratio between 1:1 and 1:5 will be chosen. If a polyunsaturated compound is included in the polymerization, the molar ratio relative to ethylene will in most cases be 0.001:1 to 1:1.

The polymerization reaction is usually carried out at a temperature between −40° and 100° C., preferably between 10° and 80° C. The pressure will usually be 1–50 ats., but higher or lower pressures are also possible. Preferably, the process is carried out continuously, but it may also be carried out semi-continuously or batchwise.

The residence time in the polymerization reaction may vary from a few seconds to a few hours. In general a residence time of between a few minutes and one hour will be chosen.

The polymerization takes place in a liquid which is inert relative to the catalyst, for instance one or more saturated aliphatic hydrocarbons, such as butane, pentane, hexane, heptane, pentamethyl heptane or petroleum fractions; aromatic hydrocarbons, for instance benzene or toluene, or halogenated aliphatic or aromatic hydrocarbons, for instance tetrachloroethylene. The temperature and the pressure may be chosen so that one or more of the monomers used, in particular the 1-alkene, for instance propylene, is liquid and is present in such a large quantity that it functions as distributor. Another distributor is not required then. The process according to the invention may be carried out in a polymerization reactor filled either with gas and liquid or with liquid only.

The molecular weight of the polymers can be influenced in general by the application of so-called chain regulators, for instance acetylene, zinc alkyls and alkyl halides and preferably by hydrogen. Even very small quantities of hydrogen influence the molecular weight to a sufficient degree and are still soluble in the polymerization medium.

From the reaction mixture obtained in the polymerization the polymer can, optionally after deactivation of the catalyst with water, with alcohol or with an acid, be separated out in the usual way by distillation, optionally whilst adding water, steam or methanol.

The copolymers obtained by the process according to the invention contain between 25 and 85% by wt. of ethylene. Preference is given, however, to products with an ethylene content of between 40 and 75% by wt. The process according to the invention can be used to particular advantage for the preparation of copolymers of an elastomeric nature. Such copolymers are suitable for a wide variery of applications, for instance for the manufacture of hose, conveyor belts, sealing profiles. If desired, they may be vulcanized by the usual methods with application of substances which yield free radicals such as peroxides, or with sulphur.

The invention will be elucidated by the following examples without being restricted thereto.

EXAMPLE 1

Preparation of terpolymers of ethylene, propylene and a polyunsaturated compound.

The polymerization was carried out in a steel 2.5-liter reactor, provided with a stirrer, a cooling jacket and the necessary feed and discharge lines. Gasoline was supplied to the reactor at a rate of 3 l/h. Ethylene and propylene in the form of gas were introduced into the reactor in the amounts stated in the table. Gasoline solutions of ethyl aluminium sesquichloride and vanadium oxytrichloride were supplied to the reactor at a rate of 0.6 l/h. The termonomer, ethylidene norbornene (EN), and the activator were dissolved in gasoline and were also supplied to the reactor at a rate of 0.6 l/h. The concentrations of the various solutions were such that the concentrations of the termonomer and the catalyst components in the reactor were maintained at the values stated in the table. The volume in the reactor was maintained at 0.6 l/h by continuously draining the polymer solution, while the temperature in the reactor was kept at 50° C. and the pressure at 6.5 ats. The reaction mixture drained from the reactor was deactivated by addition of methanol, and the polymer concentration was determined. The polymer concentration of the solution is a measure of the activity of the catalyst system. The data and the results are stated in Table 1.

TABLE 1

| Experiment nr. | activator type | activator mmol/l | SEAC mmol/l | VOCl$_3$ mmol/l | EN mmol/l | C$_2$H$_4$ l/h | C$_3$H$_6$ l/h | -sol. conc. g/l | C$_3$ cont. % by wt. | EN cont. % by wt. |
|---|---|---|---|---|---|---|---|---|---|---|
| 1* | — | — | 2.0 | 0.1 | 13 | 107 | 461 | 6.6 | 40.4 | 4.1 |
| 2 | 1 | 0.40 | 2.0 | 0.1 | 15 | 129 | 446 | 12.6 | 38.9 | 4.1 |
| 3 | 2 | " | " | " | " | " | " | 11.0 | 35.5 | 4.4 |
| 4 | 3 | " | " | " | " | " | " | 12.0 | 39.5 | 4.3 |

*not in accordance with the invention.
activators:
1 = diphenyl dichloromethane
2 = triphenyl chloromethane
3 = 1,2-diphenyl tetrachloroethane
SEAC = ethyl aluminum sesquichloride
C$_3$ cont. = the concentration of propylene units in the polymer.

Experiment 2 was repeated, with ethyl benzoate additionally present in the reactor in a concentration of 1.2 mmol/l. The solution concentration in that case was 22.2 g/l.

EXAMPLE 2

In a similar manner as described in example 1, terpolymers of ethylene, propylene and ethylidene norbornene were prepared at 50° C. and 6.5 ats. The activator in this case was para-nitrobenzyl chloride. In two experiments hydrogen was supplied to the reactor in order to lower the molecular weight of the polymers formed. The data and the results are stated in Table 2.

TABLE 2

| Experiment no. | activator mmol/l | SEAC mmol/l | VOCl$_3$ mmol/l | EN mmol/l | C$_2$H$_4$ l/h | C$_3$H$_6$ l/h | H$_2$ l/h | sol. conc. g/l | C$_3$ cont. % by wt. | EN cont. % by wt. |
|---|---|---|---|---|---|---|---|---|---|---|
| 1 | — | 2.0 | 0.1 | 15 | 108 | 470 | — | 6.4 | 36.3 | 4.6 |
| 2 | 0.4 | " | " | " | 108 | " | — | 15.6 | 45.4 | 3.8 |

TABLE 2-continued

| Experiment no. | activator mmol/l | SEAC mmol/l | VOCl3 mmol/l | EN mmol/l | C2H4 l/h | C3H6 l/h | H2 l/h | sol. conc. g/l | C3 cont. % by wt. | EN cont. % by wt. |
|---|---|---|---|---|---|---|---|---|---|---|
| 3 | " | " | " | " | 135 | " | — | 19.0 | 44.9 | 3.6 |
| 4 | " | " | " | " | 180 | " | 15 | 24.6 | 44.7 | 3.4 |
| 5 | " | " | " | " | 180 | " | — | 26.2 | 35.6 | 3.2 |
| 6 | " | " | " | " | 229 | " | — | 33.4 | 34.9 | 2.9 |
| 7 | " | " | " | " | 255 | 446 | 15 | 36.8 | 34.2 | 2.9 |

EXAMPLE 3

In a similar manner as described in example 1, terpolymers of ethylene, propylene and ethylidene norbornene were prepared at 50° C. and 6.5 ats. The activator in this series of experiments was oxalyl chloride. Again, hydrogen was supplied to the reactor in two experiments in order to lower the molecular weight of the polymers formed. The data and the results are stated in Table 3.

TABLE 3

| Experiment no. | activator mmol/l | SEAC mmol/l | VOCl3 mmol/l | EN mmol/l | C2H4 l/h | C3H6 l/h | H2 l/h | sol. conc. g/l | C3 cont. % by wt. | EN cont. % by wt. |
|---|---|---|---|---|---|---|---|---|---|---|
| 1 | 0.4 | 2.0 | 0.1 | 15 | 108 | 470 | — | 11.0 | 41.4 | 4.2 |
| 2 | " | " | " | " | 135 | 470 | — | 13.0 | 40.4 | 3.5 |
| 3 | " | " | " | " | 180 | 470 | 15 | 17.6 | 37.7 | 3.6 |
| 4 | " | " | " | " | 255 | 446 | 22 | 23.2 | 31.3 | 2.9 |

EXAMPLE 4

When the experiments described above were repeated with the corresponding bromine compounds, analogous results could be obtained.

I claim:

1. A process for copolymerization to form copolymers containing
   from 25-85 Wt.% of ethylene units,
   from 15-75 Wt.% of units of at least one other 1-alkene,
   and up to 20% of units of aliphatic or alicyclic polyunsaturated monomer of from 3 to 20 carbon atoms and having at least two carbon-carbon double bonds
wherein the catalyst system employed contains
   (I) a compound of metal from Periodic Table Groups IVb-VIb,
   (II) a compound of metal from Periodic Table Groups I-III in which at least one hydrocarbon group is bound directly to the metal atom through a carbon atom in the presence of a halogen compound of the general formula $$A-\underset{\underset{Y}{|}}{\overset{\overset{X}{|}}{C}}-Z$$

wherein
A is a phenyl or benzoyl group having from one to two substituent nitro groups,
X is a chlorine or bromine atom,
Y is a chlorine, bromine or hydrogen atom, or a hydrocarbon group of from 1 to 8 carbon atoms, and
Z is a hydrogen atom or a group of one of the following formulae, wherein R and R' represent a hydrocarbon group of 1 to 8 carbon atoms and X' is a chlorine or bromine atom:

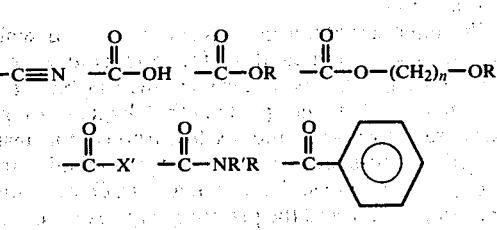

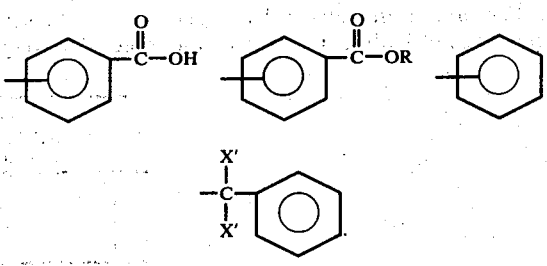

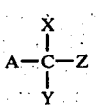

2. Process according to claim 1, characterized in that the halogen-containing compound contains one or two halogen atoms.
3. Process according to claim 1, characterized in that the halogen-containing compound is para-nitrobenzyl chloride.
4. Process according to any one of the claims 1, 2, or 3, characterized in that the catalyst system contains a vanadium compound which is soluble in the polymerization medium, and an alkyl aluminium halide.
5. Process according to any one of claims 1, 2 or 3, characterized in that the catalyst system contains vanadium oxytrichloride and ethyl aluminium sesquihalide.
6. Process according to any one of the claims 1, 2, or 3, characterized in that the halogen-containing compound is applied in such a quantity that the molar ratio relative to the metal from groups IV-VI is between 0.1:1 and 300:1.
7. Process according to any one of claim 1, 2 or 3, characterized in that the halogen-containing compound is applied in such a quantity that the molar ratio relative to the metal from groups IV-VI is between 1:1 and 50:1.
8. A process for copolymerization to form copolymers containing
   from 25-85 Wt.% of ethylene units, from 15–75 Wt.% of units of at least one other 1-alkene,
and up to 20% of units of aliphatic or alicyclic polyunsaturated monomer of from 3 to 20 carbon atoms and having at least two carbon-carbon double bands
wherein the catalyst system employed contains
(I) vanadium oxytrichloride,
(II) ethyl aluminum sesquihalide, in the presence of a halogen compound of the general formula:

wherein
A is a phenyl or benzoyl group having from one to two substituent nitro groups,
X is a chlorine or bromine atom,
Y is a chlorine, bromine or hydrogen atom, or a hydrocarbon group of from 1 to 8 carbon atoms, and
Z is a hydrogen atom or a group of one of the following formulae, wherein R and R' represent a hydrocarbon group of 1 to 8 carbon atoms and X' is a chlorine or bromine atom:

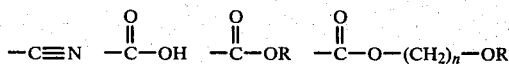

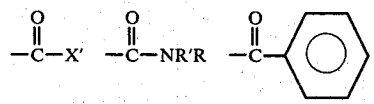

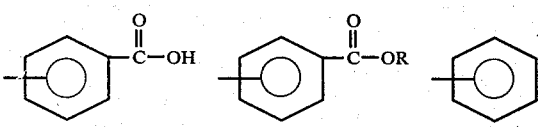

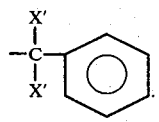

9. The process of claim 8 wherein said molar ratio is between 1:1 and 50:1.

* * * * *

UNITED STATES PATENT AND TRADEMARK OFFICE
CERTIFICATE OF CORRECTION

PATENT NO. :   4,420,595
DATED      :   December 13, 1983
INVENTOR(S) :  Georges G. Evens It is certified that error appears in the above-identified patent and that said Letters Patent is hereby corrected as shown below:

Claim 9 should read as follows:

"9. The process of claim 8 wherein the molar ratio between said halogen compounds and vanadium is between 1:1 and 50:1."

Signed and Sealed this

Fifteenth Day of May 1984

[SEAL]

*Attest:*

GERALD J. MOSSINGHOFF

*Attesting Officer*  *Commissioner of Patents and Trademarks*